US012023582B2

(12) United States Patent
Sun

(10) Patent No.: US 12,023,582 B2
(45) Date of Patent: Jul. 2, 2024

(54) VIRTUAL BACKPACK INTERFACE

(71) Applicant: Tencent Technology (Shenzhen) Company Limited, Shenzhen (CN)

(72) Inventor: Dajia Sun, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 537 days.

(21) Appl. No.: 16/931,262

(22) Filed: Jul. 16, 2020

(65) Prior Publication Data

US 2020/0346113 A1 Nov. 5, 2020

Related U.S. Application Data

(63) Continuation of application No. PCT/CN2019/084913, filed on Apr. 29, 2019.

(30) Foreign Application Priority Data

Jun. 27, 2018 (CN) .......................... 201810680093.5

(51) Int. Cl.
*A63F 13/00* (2014.01)
*A63F 13/533* (2014.01)
(Continued)

(52) U.S. Cl.
CPC ............ *A63F 13/533* (2014.09); *A63F 13/58* (2014.09); *A63F 13/69* (2014.09); *A63F 13/837* (2014.09);
(Continued)

(58) Field of Classification Search
CPC .......... A63F 13/23; A63F 13/45; A63F 13/56; A63F 13/837
See application file for complete search history.

(56) References Cited

U.S. PATENT DOCUMENTS

2014/0315646 A1 10/2014 Mizuno
2015/0165318 A1 6/2015 Yoshikawa et al.
(Continued)

FOREIGN PATENT DOCUMENTS

CN 103617029 A 3/2014
CN 103942696 A 7/2014
(Continued)

OTHER PUBLICATIONS

The Division Full Gameplay https://www.youtube.com/watch?v=8alg5hYdljk&t=8400s (Year: 2016).*
(Continued)

*Primary Examiner* — David L Lewis
*Assistant Examiner* — Eric M Thomas
(74) *Attorney, Agent, or Firm* — ArentFox Schiff LLP

(57) ABSTRACT

A method for displaying a virtual backpack interface in a game application is provided. A main interface including a virtual environment of a virtual object in the game application is displayed. A backpack display signal is received during the display of the main interface. The virtual backpack interface that includes at least two sublists including different types of virtual items is displayed in response to the backpack display signal. Each of the sublists includes only one of the different types of virtual items. The different types of virtual items include at least one of a healing type, a gun attachment type, and an ammunition type.

21 Claims, 8 Drawing Sheets

(51) Int. Cl.
  *A63F 13/58* (2014.01)
  *A63F 13/69* (2014.01)
  *A63F 13/837* (2014.01)

(52) U.S. Cl.
  CPC ... *A63F 2300/308* (2013.01); *A63F 2300/575* (2013.01)

(56) References Cited

U.S. PATENT DOCUMENTS

| | | | |
|---|---|---|---|
| 2016/0063551 A1 | 3/2016 | Yankovich et al. | |
| 2016/0171827 A1* | 6/2016 | Washington | G07F 17/3227 463/16 |
| 2016/0171835 A1* | 6/2016 | Washington | A63F 13/352 463/25 |
| 2017/0076553 A1* | 3/2017 | Washington | A63F 13/822 |

FOREIGN PATENT DOCUMENTS

| | | |
|---|---|---|
| CN | 103942697 A | 7/2014 |
| CN | 103957148 A | 7/2014 |
| CN | 103996124 A | 8/2014 |
| CN | 106779933 A | 5/2017 |
| CN | 107930120 A | 4/2018 |
| CN | 108159696 A | 6/2018 |
| CN | 108888956 A | 11/2018 |
| WO | WO2018/104921 A1 | 6/2018 |

OTHER PUBLICATIONS

The Division Full Gameplay—https://youtu.be/E2ULz-01_Bc (Year: 2016).*

International Search Report Issued in Application PCT/CN2019/084913 on Jul. 18, 2019, with English Machine Translation (6 pages).

Written Opinion Issued in Application PCT/CN2019/084913 on Jul. 18, 2019 (4 pages).

Iceburn "Baggins Powerful Backpack/Bank Custom Item Classification" TG Bus http://wow.tgbus.c om/shell/beibao/200711/20071129162 600.shtml published Nov. 29, 2007 (4 pages).

Office Action dated Jul. 30, 2021 issued in corresponding Chinese patent application No. 201810680093.5 (with English translation) (9 pages).

* cited by examiner

VIRTUAL BACKPACK INTERFACE

RELATED APPLICATION

This application is a continuation of International Application No. PCT/CN2019/084913, filed on Apr. 29, 2019, which claims priority to Chinese Patent Application No. 201810680093.5, entitled "DISPLAY METHOD FOR VIRTUAL BACKPACK DISPLAY INTERFACE, DEVICE, AND STORAGE MEDIUM" and filed on Jun. 27, 2018. The entire disclosures of the prior applications are hereby incorporated by reference in their entirety.

FIELD OF THE TECHNOLOGY

This application relates to the field of computer technologies, including display of a virtual backpack.

BACKGROUND OF THE DISCLOSURE

Electronic devices such as a smartphone and a tablet computer are provided with many application programs including a three-dimensional virtual environment, such as a virtual reality application program, a three-dimensional map program, a military simulation program, a third-person shooting (TPS) game, a first-person shooting (FPS) game, and a multiplayer online battle arena (MOBA) game. In the foregoing application programs, a virtual object (e.g., a virtual character) may obtain virtual items in the three-dimensional virtual environment through actions such as picking up virtual items and purchasing virtual items.

Generally, after the virtual object picks up a virtual item, the virtual object may check the virtual item picked up by the virtual object in a virtual backpack interface. Virtual items are displayed in a list in the virtual backpack interface. In the list, all picked-up virtual items are arranged and displayed in a predetermined sequence. For example, a predetermined arrangement sequence includes a medicine A, a medicine B, a gunstock a, a grip b, and 5.56-mm bullets (briefly referred to as 5.56 bullets). Assuming that virtual items picked up by the virtual object include the medicine A, the grip b, and the 5.56 bullets. The virtual items displayed in the virtual backpack interface are the medicine A, the grip b, and the 5.56 bullets from top to bottom in the list.

SUMMARY

Embodiments of this application include a method and apparatus for displaying a virtual backpack interface in a game application, and a non-transitory computer readable storage medium.

According to an aspect of this application, a method for displaying a virtual backpack interface in a game application is provided. In the method, a main interface including a virtual environment of a virtual object in the game application is displayed. A backpack display signal during the display of the main interface is received, the virtual backpack interface is displayed includes at least two sublists including different types of virtual items in response to the backpack display signal, each of the sublists including only one of the different types of virtual items, one of the types of virtual items being one of a healing type, a gun attachment type, and an ammunition type.

According to another aspect of this application, a display apparatus is provided. The display apparatus includes processing circuitry configured to display a main interface including a virtual environment of a virtual object in a game application. The processing circuitry is configured to receive a backpack display signal during the display of the main interface. The processing circuitry is further configured to display a virtual backpack interface that includes at least two sublists including different types of virtual items in response to the backpack display signal, each of the sublist including only one of the different types of virtual items, the different types of virtual items including at least one of a healing type, a gun attachment type, and an ammunition type.

According to another aspect of this application, an electronic device is provided, including a processor and a memory, the memory storing at least one computer-readable instruction, and the computer-readable instruction being loaded and executed by the processor to implement the method according to any one of the foregoing aspects.

According to another aspect of this application, a non-transitory computer-readable storage medium is provided. The non-transitory computer-readable storage medium stores instructions which when executed by at least one processor cause the at least one processor to display a main interface including a virtual environment of a virtual object in a game application. The instructions cause the at least one processor to receive a backpack display signal during the display of the main interface. The instructions further cause the at least one processor to display the virtual backpack interface that includes at least two sublists including different types of virtual items in response to the backpack display signal, each of the sublists including only one of the different types of virtual items, the different types of virtual items including at least one of a healing type, a gun attachment type, and an ammunition type According to another aspect of this application, a computer program product is provided, the computer program product, when run on a computer, causing the computer to perform the display method for a virtual backpack interface according to the foregoing embodiments of this application.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation on the scope of this application. In the accompanying drawings.

DESCRIPTION OF EMBODIMENTS

Figure 1:
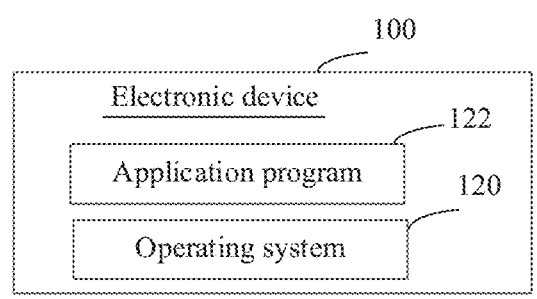
FIG. 1 is a structural block diagram of an electronic device according to an embodiment of this application.

To make the objectives, technical solutions, and advantages of this application clearer, the following embodiments of this application describe implementations of this application in detail with reference to the accompanying drawings.

First, several terms described in the embodiments of this application are briefly introduced.

Virtual environment: a virtual environment displayed (or provided) by an application program when run on an electronic device. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment, and description is made by using an example in which the virtual environment is a three-dimensional virtual environment in the following embodiments of this application, but this is not limited. Optionally, the virtual environment is further used for a virtual environment battle between at least two virtual roles. Optionally, the virtual environment is further used for a battle between at least two virtual roles by using virtual guns. Optionally, the virtual environment is further used for a battle between at least two virtual roles by using virtual guns in a range of a target region, and the range of the target region may be continuously decreased as time goes by in the virtual environment.

Virtual object: a movable object in a virtual environment. The movable object may be at least one of a virtual character, a virtual animal, and a cartoon character. Optionally, when the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

Virtual gun: a virtual weapon that attacks by shooting virtual bullets in a virtual environment. The virtual character may pick up a virtual gun in the virtual environment, and attack by using the virtual gun picked up in the virtual environment. Optionally, each virtual gun may be provided with at least one slot, and each slot is configured to assemble at least one virtual gun attachment. For example, an M16A4 automatic rifle is generally provided with a muzzle slot, a grip slot, a clip slot, a gunstock slot, and a sight slot, where an attachment that can be assembled to the grip slot includes at least one of a vertical grip, an angled grip, a half grip, a light grip, and a thumb grip.

Optionally, the virtual gun includes a plurality of different types of guns, and each type of virtual guns further includes a plurality of different gun models. For example, gun types of the virtual gun at least include: an automatic rifle, a sniper rifle, a shotgun, a pistol, a submachine gun, and the like, and gun models of the automatic rifle further include an LVOA-C automatic rifle, an AKM automatic rifle, an SCAR-L automatic rifle, an AUG automatic rifle, an M16A4 automatic rifle, a GROZA automatic rifle, and the like.

Virtual gun battle: a virtual gun battle refers to a game mode in which at least two virtual objects use virtual guns for a battle in a virtual environment. Optionally, the virtual gun battle is a single round battle mode in which at least two virtual objects use virtual guns in a battle. Each round of a virtual gun battle corresponds to one battle duration/a number of people in battle. When the virtual gun battle corresponds to the battle duration, a virtual object that survives to the end of the battle duration wins the battle; and when the virtual gun battle corresponds to the number of people in battle, the last virtual object or the last group of surviving virtual objects wins the battle.

Type: the type optionally refers to a type of a virtual item that can be picked up and/or purchased in a virtual environment. Optionally, the type includes at least one of a healing type, a gun attachment type, and an ammunition type.

Healing type: a healing type is a type of virtual item (e.g., healing medicine) for recovering a hit point value or energy of a virtual object. Optionally, virtual items included by the healing type include at least one of a med kit, a first aid kit, a bandage, an energy drink, a painkiller, and an adrenaline syringe, where the med kit, the first aid kit, and the bandage can recover the hit point value of the virtual object. For example, the med kit can recover the hit point value of the virtual object to a full value (e.g., 100%), the first aid kit can recover the hit point value of the virtual object by 50%, and a single use of the bandage can recover the hit point value of the virtual object by 15%. Optionally, when the hit point value of the virtual object is reduced to 0%, the virtual object is determined to be in a state of losing life in the virtual environment. A teammate may increase the hit point value of the virtual object (e.g., in a manner of helping teammates up) when the teammate of the virtual object has a hit point value greater than 0%, and when the teammate of the virtual object is also in a state of losing life, the virtual object is directly in a dead state (e.g., the virtual object is eliminated from the game). Optionally, in the foregoing virtual items of the healing type, the energy drink, the painkiller, and the adrenaline syringe can recover an energy value of the virtual object, where a single use of the energy drink can recover the energy value of the virtual object by 40% (a total value of energy does not exceed 100%), a single use of the painkiller can recover the energy value of the virtual object by 60% (a total value of the energy does not exceed 100%), and a single use of the adrenaline syringe can recover the energy value of the virtual object to 100%. Optionally, the energy value can recover the hit point value of the virtual object. For example, every 20% energy value can recover 10% hit point value of the virtual object in a preset duration.

Gun attachment type: the gun attachment type is a type of virtual item for assembling a virtual gun that a virtual object is equipped with. Optionally, virtual items included by the gun attachment type include at least one of a muzzle, a grip, a clip, a gunstock, and a sight, where the virtual gun includes types of an automatic rifle, a sniper rifle, a shotgun, a pistol, and a submachine gun, and the muzzles, the grips, the clips, the gunstocks, and the sights corresponding to different gun types of virtual guns or different gun models of virtual guns are also different. For example, a grip that is assembled in the M16A4 automatic rifle cannot be used in another virtual gun.

Ammunition type: the ammunition type is a type of virtual item for assembling a clip of a virtual gun or for being thrown. Optionally, virtual items included by the ammunition type include at least one of a 5.56 bullet, a 7.62 bullet, a 9-mm bullet, a .45-caliber bullet, a grenade, and a smoke grenade. The 5.56 bullet, the 7.62 bullet, the 9-mm bullet, and the .45-caliber bullet are loaded into a clip of a virtual gun. For example, a clip of the M16A4 automatic rifle matches the 5.56 bullet. Optionally, the grenade and the smoke grenade are thrown. After being thrown by one virtual object, the grenade attacks a virtual object in a preset attack range and reduces the hit point value of the virtual object in the preset attack range; and after being thrown, the smoke grenade releases smoke in a preset smoke range.

The electronic device in this application may be a desktop computer, a portable laptop computer, a mobile phone, a tablet computer, an ebook reader, a moving picture experts group audio layer III (MP3) player, a moving picture experts group audio layer IV (MP4) player, or the like. An application program supporting a virtual environment is installed and run on the electronic device, such as an application program supporting a three-dimensional virtual environment. The application program may be any one of a virtual reality application program, a three-dimensional map program, a military simulation program, a TPS game, an FPS game, and a MOBA game. Optionally, the application program may be a standalone application program, such as a standalone 3D game program, or may be a network online application program.

FIG. 1 shows a structural block diagram of an electronic device according to an exemplary embodiment of this application. The electronic device 100 includes: an operating system 120 and an application program 122.

The operating system 120 is basic software provided for the application program 122 to perform secure access to computer hardware.

The application program 122 is an application program supporting a virtual environment. Optionally, the application program 122 is an application program supporting a three-dimensional virtual environment. The application program 122 may be any one of a virtual reality application program, a three-dimensional program, a military simulation program, a TPS game, an FPS game, a MOBA game, and a multiplayer shooting survival game. The application program 122 may be a standalone application program, such as a standalone 3D game program.

Figure 2:
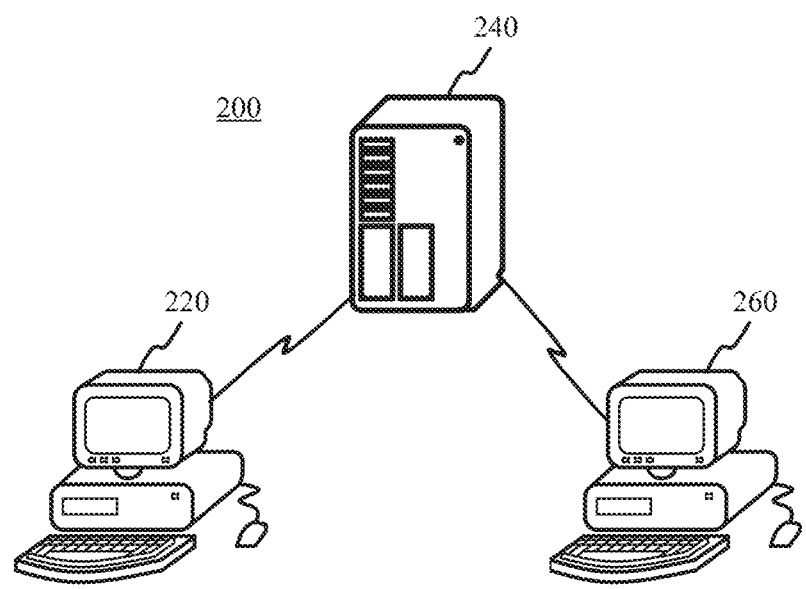
FIG. 2 is a structural block diagram of a computer system according to an embodiment of this application.

FIG. 2 shows a structural block diagram of a computer system according to an exemplary embodiment of this application. The computer system 200 includes: a first device 220, a server 240, and a second device 260.

An application program supporting a virtual environment is installed and run on the first device 220. The application program may be any one of a virtual reality application program, a three-dimensional map program, a military simulation program, a TPS game, an FPS game, a MOBA game, and a multiplayer shooting survival game. The first device 220 is a device used by a first user, and the first user uses the first device 220 to control a first virtual object in the virtual environment to perform a movement, and the movement includes, but is not limited to, at least one of body posture adjustment, crawling, walking, running, cycling, jumping, driving, picking-up, shooting, attacking, and throwing. Exemplarily, the first virtual object is a first virtual character, such as a simulated character role or a cartoon character role.

The first device 220 is connected to the server 240 through a wireless network or a wired network.

The server 240 includes at least one of one server, a plurality of servers, a cloud computing platform, and a virtualization center. The server 240 is configured to provide background services for the application program supporting a three-dimensional virtual environment. Optionally, the server 240 takes on primary computing work, and the first device 220 and the second device 260 take on secondary computing work; alternatively, the server 240 takes on secondary computing work, and the first device 220 and the second device 260 take on primary computing work; alternatively, collaborative computing is performed by using a distributed computing architecture among the server 240, the first device 220, and the second device 260.

An application program supporting a virtual environment is installed and run on the second device 260. The application program may be any one of a virtual reality application program, a three-dimensional map program, a military simulation program, an FPS game, a MOBA game, and a multiplayer shooting survival game. The second device 260 is a device used by a second user, and the second user uses the second device 260 to control a second virtual object in the virtual environment to perform a movement, and the movement includes, but is not limited to, at least one of body posture adjustment, crawling, walking, running, cycling, jumping, driving, picking-up, shooting, attacking, and throwing. Exemplarily, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may alternatively belong to different teams, different organizations, or two groups hostile to each other.

Optionally, the application programs installed in the first device 220 and the second device 260 are the same, or the application programs installed in the two devices are the same type of application programs of different control system platforms. The first device 220 may generally refer to one of a plurality of devices, and the second device 260 may generally refer to one of a plurality of devices. In this embodiment, description is made by using only the first device 220 and the second device 260 as an example. Device types of the first device 220 and the second device 260 are the same or different. The device type includes at least one of a game console, a desktop computer, a smartphone, a tablet computer, an ebook reader, an MP3 player, an MP4 player, and a portable laptop computer. In the following embodiment, description is made by using an example in which the device is a desktop computer.

A person skilled in the art should understand that there may be more or fewer devices. For example, there may be only one device, or there may be dozens of or hundreds of devices, or there may be more devices. The quantity and the device types of the devices are not limited in the embodiments of this application.

Figure 3:
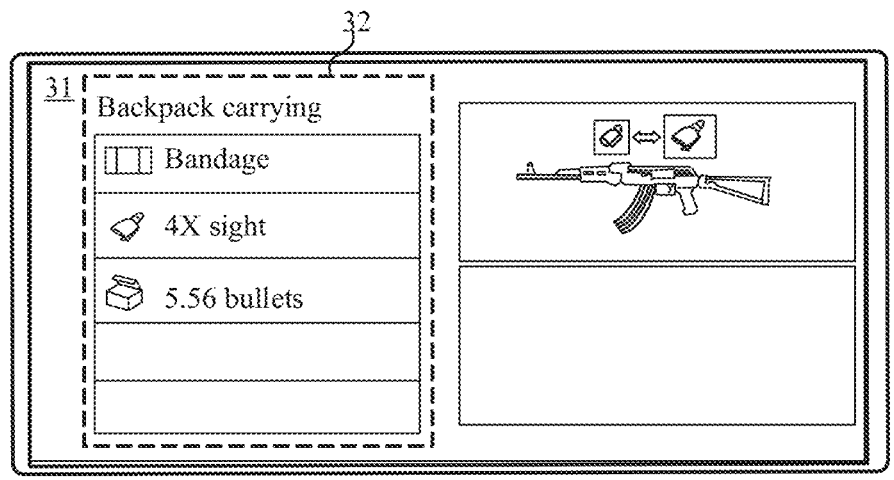
FIG. 3 is a schematic diagram of an interface of an exemplary virtual backpack interface.

Generally, when virtual items are displayed in a backpack display interface, a virtual item list is displayed in the backpack display interface. As shown in FIG. 3, FIG. 3 is a schematic diagram of an interface of an exemplary virtual backpack interface. A virtual item list 32 is displayed in a backpack display interface 31, and virtual items picked up by the virtual object are displayed in the virtual item list 32. Then, the virtual item list 32 displays the virtual items in a single column, and when there are a relatively large quantity of virtual items and a user needs to check a target virtual item that is ranked relatively low, the user needs to scroll down toward the bottom of the list, which makes the process of checking the target virtual item less efficient, and there can be a lot of steps for checking the target virtual item.

Figure 4:
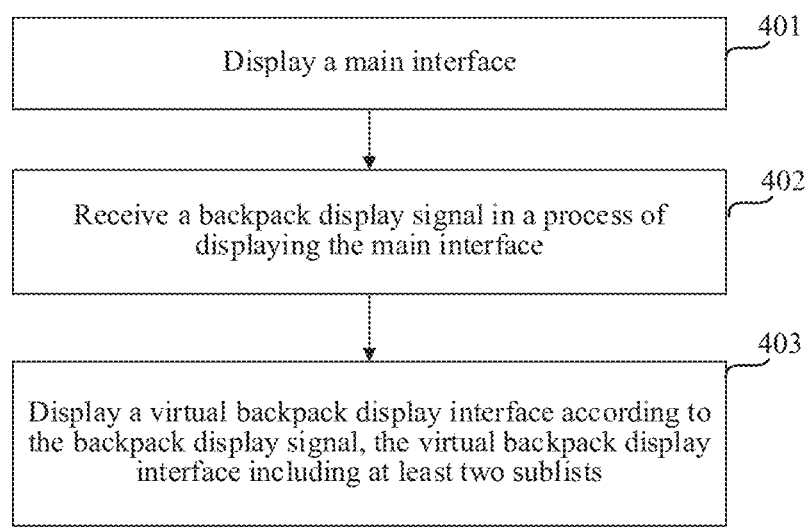
FIG. 4 is a flowchart of a display method for a virtual backpack interface according to an embodiment of this application.

A method for displaying a virtual backpack interface according to an embodiment of this application is described with reference to the foregoing brief introduction of the terms. Referring to the method illustrated in FIG. 4. FIG. 4 is a flowchart of a method for displaying a virtual backpack interface according to an exemplary embodiment of this application. Description is made in this embodiment by using an example in which the method is applied to an electronic device.

In step 401, a main interface is displayed. For example, processing circuitry displays a main interface including a virtual environment of a virtual object in a video game application.

Optionally, the main interface includes a picture of a virtual environment observed by a virtual object in a virtual gun battle process. Optionally, the target virtual object is configured to obtain a virtual item in the virtual environment, where the virtual object may obtain the virtual item in a picking-up manner, or obtain the virtual item in a purchasing manner, or obtain the virtual item in a lottery drawing manner. This is not limited in the embodiments of this application.

Optionally, in the virtual environment, a posture of the virtual object includes at least one of standing, squatting, going prone, creeping, walking, and running. Optionally, the virtual object may be in a state of holding a gun, or may be in a state of not holding a gun. Optionally, when the virtual object is in a state of holding a gun, the main interface may include a picture obtained by observing the virtual environment by using a sight, and may alternatively include a picture obtained by observing the virtual environment without a sight.

In step 402, a backpack display signal is received in a process of displaying the main interface. For example, processing circuitry receives a backpack display signal during the display of the main interface.

Optionally, the backpack display signal is used for instructing to display the virtual backpack interface. Optionally, the virtual backpack interface is used for displaying virtual items that have been owned by the target virtual object.

Optionally, a manner in which the electronic device receives the backpack display signal includes at least one of the following manners:

First, receive a shortcut key operating signal.

It is determined that the backpack display signal is received when a shortcut key combination corresponding to the shortcut key operating signal is a target shortcut key combination; or it is determined that the backpack display signal is received when a shortcut key corresponding to the shortcut key operating signal is a target shortcut key.

When the electronic device is a desktop computer or a portable laptop computer, the shortcut key operating signal may be triggered by an input operation of an external input device. For example, a shortcut key signal is triggered by clicking a left button of a mouse, or the shortcut key signal is triggered by entering a Tab key of a keyboard. When the electronic device is a mobile terminal such as a mobile phone or a tablet computer, the shortcut key operating signal may be triggered by triggering a physical key on the mobile terminal, or may be triggered by an input operation on a virtual keyboard displayed in a touch screen.

Second, the main interface further includes a backpack display control, and it is determined that the backpack display signal is received when a tap signal on the backpack display control is received.

When the electronic device is a desktop computer or a portable laptop computer, the tap signal may be triggered by an input operation of an external input device. For example, a tap signal is triggered by using a mouse to click the backpack display control. When the electronic device is a mobile terminal such as a mobile phone or a tablet computer, the tap signal may be triggered by touching the backpack display control on a touch display screen.

In step 403, a virtual backpack interface is displayed according to the backpack display signal, the virtual backpack interface including at least two sublists. For example, the processing circuitry displays the virtual backpack interface that includes at least two sublists including different types of virtual items in response to the backpack display signal, each of the sublists including only one of the different types of virtual items, the types of virtual items including one of a healing type, a gun attachment type, and an ammunition type.

The virtual backpack interface is used for displaying virtual items owned by the virtual object, the virtual backpack interface includes at least two sublists, and each sublist is used for displaying a same type of virtual item. Optionally, the type includes at least one of a healing type, a gun attachment type, and an ammunition type.

For example, description is made by using an example in which the virtual backpack interface includes two sublists. The virtual backpack interface includes at least a first sublist and a second sublist, the first sublist is used for storing and displaying a first type of virtual item, and the second sublist is used for storing and displaying a second type of virtual item. Optionally, the virtual backpack interface may further include more sublists, and this is not limited in the embodiments of this application.

Optionally, a display sequence of the sublists in the virtual backpack interface is determined according to priorities of types of virtual items corresponding to the sublists, and the sublists are displayed sequentially according to the display sequence while displaying the virtual backpack interface.

For example, the sublists corresponding to the types are displayed sequentially in the virtual backpack interface from top to bottom according to the priorities of the types in descending order; alternatively, the sublists corresponding to the types are displayed sequentially in the virtual backpack interface from bottom to top according to the priorities of the types in descending order; alternatively, the sublists corresponding to the types are displayed sequentially in the virtual backpack interface from left to right according to the priorities of the types in descending order; alternatively, the sublists corresponding to the types are displayed sequentially in the virtual backpack interface from right to left according to the priorities of the types in descending order. An arrangement direction of the sublists is not specifically limited in the embodiments of this application.

Optionally, before performing step 403, a priority of the type corresponding to each sublist needs to be determined first, and the display sequence of the sublists in the virtual backpack interface needs to be determined according to the priorities of the types corresponding to the sublists. A manner in which the display sequence of the sublists is determined includes at least one of the following manners:

First, a configuration file obtained by the electronic device from a server includes the display sequence of the sublists in the virtual backpack interface.

Optionally, the configuration file may directly configure displayed coordinates of each sublist in the virtual backpack interface. For example, the configuration file sets a length and a width of each sublist, and sets a coordinate point of a top left corner of each sublist in the virtual backpack interface; alternatively, the configuration file may set an arrangement sequence, lengths, and widths of the sublist, where the widths of the sublists are consistent with each other. For example, in the configuration file, the arrangement sequence of the included sublists are: a sublist A (length: 15, width: 5), a sublist C (length: 15, width: 5), and a sublist B (length: 10, width: 5), and in the virtual backpack interface, the foregoing three sublists are displayed in a sequence of the sublist A, the sublist C, and the sublist B. The sequence of the sublist A, the sublist C, and the sublist B corresponds to the priorities of the types corresponding to the three sublists. That is, the type corresponding to the sublist A is a highest priority, the type corresponding to the sublist C is a second priority, and the type corresponding to the sublist B is a third priority.

Second, the foregoing priorities are obtained by sorting usage frequencies of the types. Historical item usage data is first obtained, the historical item usage data includes the usage frequencies of the types, and the usage frequencies of the types are sorted according to the historical item usage data, to obtain the priorities of the types.

Optionally, the historical item usage data may be usage data of all items recorded in a client on the electronic device, or may be usage data of items in a latest preset duration, or may be usage data of items in a latest preset quantity of games.

Optionally, the usage frequency of the type refers to a frequency at which the virtual item of the type is used. Optionally, a usage frequency of a virtual item may be obtained by calculating at least one parameter of a number of times for which the virtual item is picked up, a number of times for which the virtual item is assembled to a virtual gun, a number of times for which the virtual item is thrown, and a number of times for which the virtual item is shot. Optionally, the usage frequency of the type may be an average number of the frequencies at which the virtual items included in the type are used, or may be a sum of the frequencies at which the virtual items included in the type are used, or may be a weighted sum of the frequencies at which the virtual items included in the type are used, and a calculation manner of the usage frequency of the type is not limited in the embodiments of this application.

For example, description is made by using an example in which the frequency at which the smoke grenade is used is calculated. In the latest 5 rounds of a game, the number of times for which the smoke grenade is picked up is 3, the number of times for which the smoke is thrown is 2, and if the number of times for which the smoke grenade is thrown is used as a parameter used for calculating the frequency at which the smoke grenade is used, the frequency at which the smoke grenade is used is 40%.

After obtaining the usage frequencies of the types, the usage frequencies of the types are sorted to obtain the priorities of the types. For example, if the usage frequency of a first type is 50%, the usage frequency of a second type is 70%, and the usage frequency of a third type is 25%, the priorities of the types are sequentially the second type, the first type, and the third type in descending order.

Third, receive a priority sorting signal, the priority sorting signal being used for instructing to sort the priorities of the types according to the priority sorting signal.

Optionally, the priority sorting signal may be transmitted by the server to the electronic device, or may be generated by a user by performing an operation on the electronic device. For example, description is made by using an example in which the priority sorting signal is generated by a user by performing an operation on the electronic device. The user may adjust, in a virtual backpack setting interface, the arrangement sequence of the sublists in the virtual backpack interface. After the adjustment is completed and the user determines an adjustment result, the priority sorting signal is generated, and the priority sorting signal is generated according to the arrangement sequence on the sublists adjusted by the user.

Fourth, determine a demand state of the virtual object; and in a case that the demand state meets a target demand state, set a target type corresponding to the target demand state to a highest priority, and sort item types other than the target type according to preset priorities, to obtain the priorities of the types according to the highest priority and the preset priorities.

In a case that the demand state meets the target demand state, the setting a target type corresponding to the target demand state to a highest priority further includes any one of the following situations:

1. Set the healing type to the highest priority in a case that a hit point value of the virtual object is less than a target hit point value.

For example, in a case that the hit point value of the virtual object is less than 50%, the healing type is set to the highest priority, so that when the user needs to recover the hit point value, the healing type is in a location with the highest priority, to help the user to quickly find a required medicine.

2. Set the ammunition type to the highest priority in a case that ammunition owned by the virtual object does not match a virtual gun that the virtual object is equipped with.

For example, when the virtual object has 5.56 bullets and the virtual gun that the virtual object is equipped with is an AKM automatic rifle (equipped with 7.62 bullets), the ammunition type is set to the highest priority, so that when the user needs to discard items in the virtual backpack, unnecessary bullets can be quickly found and discarded.

3. Set the gun attachment type to the highest priority in a case that a first attachment assembled in a target slot of the virtual gun is damaged and the virtual object owns a second attachment that can be assembled to the target slot.

Based on the above, according to the display method for a virtual backpack interface provided in this embodiment, a plurality of sublists are displayed in the virtual backpack interface, and each sublist stores and displays virtual items of different types, so that when the user seeks a virtual item, the user only needs to seek for the virtual item in a sublist corresponding to the type, to avoid a problem that when seeking a virtual item, due to a relatively large quantity of virtual items in the virtual backpack, the user needs to scroll down toward the bottom of a single list in the virtual backpack for a long time to seek for the virtual item, thereby improving the efficiency of seeking the virtual item and reducing steps for seeking the virtual item.

According to the method provided in this embodiment, the sublists corresponding to the types are displayed sequentially according to the priorities of the types, and the virtual items with different priorities are displayed at different locations in the virtual backpack interface, so that when the user seeks a virtual item, and the priority corresponds to a probability of being found, the probability that the user finds the virtual item at the fastest speed is improved.

The virtual backpack in the foregoing embodiment may be a virtual backpack obtained by the user through picking-up in the virtual environment. That is, the virtual object picks up the virtual backpack to obtain a capability of accommodating a specific capacity of virtual items, and a backpack is displayed on the back of the virtual object. When the virtual object does not pick up a virtual backpack, the virtual object still has the capability of picking up virtual items, that is, the virtual object has a default backpack, but the default backpack is not displayed on the back of the virtual object. However, when the virtual object does not pick up a virtual backpack, a capacity of virtual items that the default backpack can accommodate is relatively small.

In an optional embodiment, the foregoing type includes the healing type, the gun attachment type, and the ammunition type, where the healing type corresponds to a first sublist, the gun attachment type corresponds to a second sublist, and the ammunition type corresponds to a third sublist.

In step 403, when displaying the virtual backpack interface according to the backpack display signal, the virtual backpack interface includes the first sublist, the second sublist, and the third sublist arranged sequentially from top to bottom.

Figure 5:
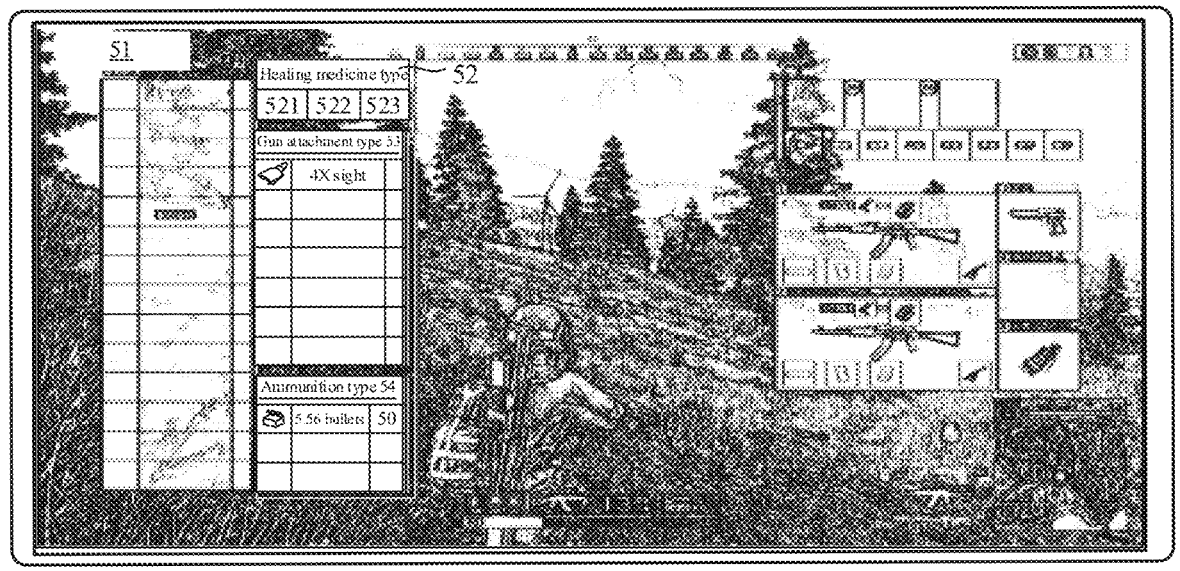
FIG. 5 is a schematic diagram of an interface of a virtual backpack interface according to an embodiment of this application.

For example, referring to FIG. 5, a virtual backpack interface 51 includes a first sublist 52, a second sublist 53, and a third sublist 54, where the first sublist 52 is a sublist corresponding to the healing type, the second sublist 53 is a sublist corresponding to the gun attachment type, and the third sublist 54 is a sublist corresponding to the ammunition type.

The first sublist 52 includes a medicine box 521, a medicine box 522, and a medicine box 523, where one medicine box is used for storing and displaying one type of medicine, and a number may be further displayed in the medicine box to represent the quantity of the medicine. For example, an icon of a first aid kit is displayed in the medicine box 521, and a number 6 is displayed in a lower left corner of the medicine box 521 to indicate that there are 6 first aid kits in total. Description is made by using three medicine boxes as an example in this embodiment, and in an actual operation, there may alternatively be more or fewer medicine boxes.

The second sublist 53 includes at least one row, and each row is used for displaying one gun attachment. As shown in FIG. 5, a 4× sight is displayed in a first row of the second sublist 53.

The third sublist 54 includes at least one row, and each row is used for displaying one type of ammunition. For example, 5.56 bullets are displayed in a first row of the third sublist 54, and the quantity of the 5.56 bullets is 50. Optionally, the quantity of the bullets in each row is not greater than 100, that is, when the quantity of the bullets in the first row reaches 100, the remaining bullets are placed in a second row, and so on.

When the virtual items in the first sublist, in the second sublist, and in the third sublist are displayed, the virtual items may be displayed sequentially according to the frequencies at which the virtual items are used, or may be displayed according to a preset display sequence, or may be displayed according to a sequence in which the virtual items are picked up, or may be displayed according to a sequence set by the user.

Based on the above, according to the method for displaying a virtual backpack interface provided in this embodiment, in a virtual gun battle, a plurality of sublists are displayed in the virtual backpack interface, and each sublist stores and displays virtual items of different types, so that when the user seeks a virtual item, the user only needs to look for the virtual item in a sublist corresponding to the type, to avoid a problem that when seeking a virtual item, due to a relatively large quantity of virtual items in the virtual backpack, the user needs to scroll down toward the bottom of a single list in the virtual backpack for a long time to look for the virtual item, thereby improving the efficiency of seeking the virtual item and reducing steps for seeking the virtual item, to satisfy a requirement that virtual items are required to be quickly found in a virtual gun battle.

According to the method provided in this embodiment, the usage frequency of the healing medicines of the user is relatively high, and is followed by the usage frequency of the gun attachments, and since the ammunition is generally automatically assembled, the usage frequency of the ammunition of the user is relatively low. Therefore, the healing type, the gun attachment type, and the ammunition type are displayed sequentially in the virtual backpack interface, thereby improving the efficiency of the user of seeking for the virtual item.

Figure 6:
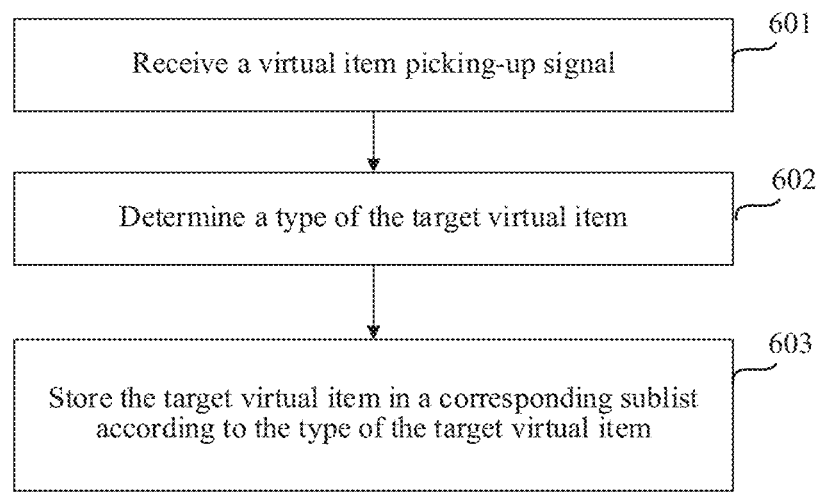
FIG. 6 is a flowchart of a display method for a virtual backpack interface according to another embodiment of this application.

In an optional embodiment, after the virtual object picks up a virtual item in the virtual environment, the virtual item needs to be stored in a sublist corresponding to the virtual item. FIG. 6 is a flowchart of a display method for a virtual backpack interface according to another exemplary embodiment of this application. Optionally, the flowchart shown in FIG. 6 may be implemented before step 401 to step 403, or may be implemented after step 401 to step 403, or may be implemented between step 401 and step 403, and a specific implementation time of the flowchart shown in FIG. 6 is not limited in the embodiments of this application.

As shown in method illustrated in FIG. 6 In step 601, a virtual item picking-up signal is received. For example, the processing circuitry receives a virtual item picking-up signal to pick up a target virtual item:

The virtual item picking-up signal is used for instructing to pick up a target virtual item.

Optionally, a manner in which an electronic device receives the virtual item picking-up signal includes at least one of the following manners:

First, receive a shortcut key operating signal.

It is determined that the virtual item picking-up signal is received when a shortcut key combination corresponding to the shortcut key operating signal is a target shortcut key combination; or it is determined that the virtual item picking-up signal is received when a shortcut key corresponding to the shortcut key operating signal is a target shortcut key.

When the electronic device is a desktop computer or a portable laptop computer, the shortcut key operating signal may be triggered by an input operation of an external input device. For example, a shortcut key signal is triggered by clicking a left button of a mouse and dragging, or the shortcut key signal is triggered by entering an F key of a keyboard. When the electronic device is a mobile terminal such as a mobile phone or a tablet computer, the shortcut key operating signal may be triggered by triggering a physical key on the mobile terminal, or may be triggered by an input operation on a virtual keyboard displayed in a touch screen.

Second, a user interface further includes a picking-up control, and when a tap signal on the picking-up control is received, it is determined that the virtual item picking-up signal is received.

When the electronic device is a desktop computer or a portable laptop computer, the tap signal may be triggered by an input operation of an external input device. For example, a tap signal is triggered by using a mouse to click the picking-up control. When the electronic device is a mobile terminal such as a mobile phone or a tablet computer, the tap signal may be triggered by touching the picking-up control on a touch display screen.

In step 602, a type of the target virtual item is determined. For example, the processing circuitry determines a type of the target virtual item.

Optionally, each type corresponds to one sublist or one group of sublists in the virtual backpack interface, and when a type of the target virtual item is determined, that is, when it is determined that the electronic device displays the virtual backpack interface, the sublist of the target virtual item is displayed.

In step 603, the target virtual item is stored in a corresponding sublist according to the type of the target virtual item. For example, the processing circuitry stores the target virtual item in a corresponding sublist to each of the sublists in response to the type of the target virtual item.

Optionally, while storing the target virtual item, any one of the following situations is included:

First, when a configuration file of the virtual backpack interface includes a sublist and parameters of the virtual items displayed in the sublist, the target virtual item may be directly stored in the sublist in the virtual backpack interface in a parameter form.

Second, when the virtual backpack display interface is displayed, the configuration file (configuration data including a sublist) of the virtual backpack interface is first read, then a data file of the virtual items displayed in the sublist is read, to display the virtual backpack interface by combining the two files, and the target virtual item may be stored in the data file corresponding to the sublist.

Based on the above, according to the display method for a virtual backpack interface provided in this embodiment, in a virtual gun battle, a plurality of sublists are displayed in the virtual backpack interface, and each sublist stores and displays virtual items of different types, so that when the user seeks a virtual item, the user only needs to look for the virtual item in a sublist corresponding to the type, to avoid a problem that when seeking a virtual item, due to a relatively large quantity of virtual items in the virtual backpack, the user needs to scroll down toward the bottom of a single list in the virtual backpack for a long time to seek for the virtual item, thereby improving the efficiency of seeking the virtual item and reducing steps for seeking the virtual item, to satisfy a requirement that virtual items are required to be quickly found in a virtual gun battle.

According to the method provided in this embodiment, while storing the target virtual item, the type of the target virtual item is first determined, and then the target virtual item is stored in a corresponding sublist according to the type, so that when the user checks the virtual backpack interface, the user may check the virtual items according to the type.

In an optional embodiment, the foregoing type includes the healing type, the gun attachment type, and the ammunition type, where the healing type corresponds to a first sublist, the gun attachment type corresponds to a second sublist, and the ammunition type corresponds to a third sublist.

Figure 7:
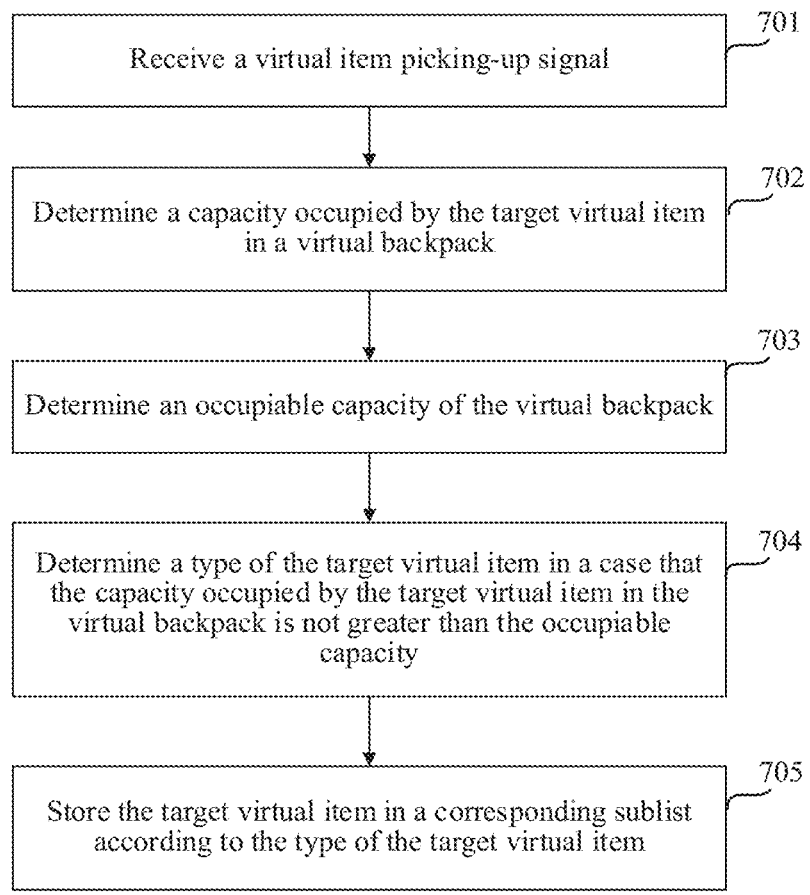
FIG. 7 is a flowchart of a display method for a virtual backpack interface according to still another embodiment of this application.

FIG. 7 is a flowchart of a display method for a virtual backpack interface according to another exemplary embodiment of this application. As shown in the method illustrated in FIG. 7.

In step 701, a virtual item picking-up signal is received. For example, the processing circuitry receives a virtual item picking-up signal.

The virtual item picking-up signal is used for instructing to pick up a target virtual item.

In step 702, a capacity occupied by the target virtual item in a virtual backpack is determined. For example, the processing circuitry determines an occupied capacity of the target virtual item in the virtual backpack.

Optionally, when the virtual item is placed in the virtual backpack, the virtual item may occupy a specific capacity, and the capacity occupied by each virtual item may be preset, or may be generated randomly. Using an example in which the capacity occupied by the target virtual item in the virtual backpack is preset, a table of a correspondence between virtual items and capacities occupied by the virtual items is prestored in an electronic device, and the electronic device may look for the capacity occupied by the target virtual item in the correspondence table. Exemplarily, the correspondence table is shown by table 1 as follows:

TABLE 1

| Sequence number | Virtual item | Occupied capacity |
| --- | --- | --- |
| 1 | 4X sight | 15/each |
| 2 | 5.56 bullets | 0.5/each |
| 3 | Cheek pad | 25/each |

When the target virtual item is a cheek pad, it is determined that a capacity occupied by the cheek pad is 25.

In step 703, an available capacity of the virtual backpack is determined. For example, the processing circuitry determines an available capacity of the target virtual item in the virtual backpack.

The available capacity of the virtual backpack may be obtained by calculating a difference between a total capacity of the virtual backpack and an occupied capacity of the virtual backpack. The total capacity of the virtual backpack varies as the virtual backpack carried by the virtual object varies. Exemplarily, when the virtual object does not pick up a backpack, a total capacity of a default backpack is 30: when the virtual object carries a level 1 backpack, the total capacity of the virtual backpack is 300; when the virtual object carries a level 2 backpack, the total capacity of the virtual backpack is 500; and when the virtual object carries a level 3 backpack, the total capacity of the virtual backpack is 800.

Optionally, the occupied capacity of the virtual backpack may be obtained by calculating a sum of the capacities occupied by the virtual items that are picked up but are not assembled to the virtual gun.

In step 704, a type of the target virtual item is determined in a case that the capacity occupied by the target virtual item in the virtual backpack is not greater than the available capacity. For example, the processing circuitry determines the type of the target virtual item in a case that the occupied capacity of the target virtual item in the virtual backpack is less than or equal to the available capacity of the target virtual item in the virtual backpack.

Optionally, in a case that the capacity occupied by the target virtual item in the virtual backpack is not greater than the available capacity, it indicates that the virtual backpack may further accommodate the target virtual item, and then the type of the target virtual item is determined.

In step 705, the target virtual item in a corresponding sublist is determined according to the type of the target virtual item.

Optionally, description is made respectively by using the healing type, the gun attachment type, and the ammunition type:

First, the healing type includes a first type, and the target virtual item is a virtual item of the first type. In a case that the first sublist corresponding to the healing type includes a first quantity of the virtual items of the first type, the first quantity is increased by a second quantity corresponding to the target virtual item, to obtain a third quantity of the target virtual items in the first sublist after picking-up. For example, if a sublist includes 3 (the first quantity) first aid kits, and the picked-up target virtual item is 1 (the second quantity) first aid kit, the 3 first aid kits in the sublist are changed to 4 (3+1) first aid kits.

In a case that the first sublist does not include the target virtual item, the target virtual item is stored in the first sublist.

Second, when the type of the target virtual item includes the gun attachment type, assemble, in a case that the virtual object is equipped with a virtual gun in the virtual environment and a slot of the virtual gun for assembling the target virtual item is empty, the target virtual item to the slot; store the target virtual item in the second sublist corresponding to the gun attachment type in a case that the virtual object is equipped with the virtual gun in the virtual environment and the slot of the virtual gun for assembling the target virtual item is not empty; store the target virtual item in the second sublist in a case that the virtual object is equipped with the virtual gun in the virtual environment and the virtual gun does not include the slot for assembling the target virtual item; and store the target virtual item in the second sublist in a case that the virtual object is not equipped with the virtual gun in the virtual environment.

Third, when the type of the target virtual item includes the ammunition type, assemble, in a case that the virtual object is equipped with a virtual gun in the virtual environment, a clip assembled in the virtual gun matches the target virtual item, and the clip is empty, the target virtual item to the clip; store the target virtual item in the third sublist corresponding to the ammunition type in a case that the virtual object is equipped with the virtual gun in the virtual environment, the clip assembled in the virtual gun matches the target virtual item, and the clip is not empty; store the target virtual item in the third sublist in a case that the virtual object is equipped with the virtual gun in the virtual environment, and the clip assembled in the virtual gun does not match the target virtual item; and store the target virtual item in the third sublist in a case that the virtual object is not equipped with the virtual gun in the virtual environment.

While storing the target virtual item in the third sublist, the target virtual item may be stored by modifying the quantity of owned target virtual items, or may be additionally stored directly.

The virtual backpack involved in the embodiments of this application does not necessarily refer to a backpack in the virtual environment, and in a case that the virtual object does not pick up a virtual backpack, the virtual object still includes a capacity for picking up virtual items.

Based on the above, according to the display method for a virtual backpack interface provided in this embodiment, a plurality of sublists are displayed in the virtual backpack interface, and each sublist stores and displays virtual items of different types, so that when the user seeks a virtual item, the user only needs to look for the virtual item in a sublist corresponding to the type, to avoid a problem that when seeking a virtual item, due to a relatively large quantity of virtual items in the virtual backpack, the user needs to scroll down toward the bottom of a single list in the virtual backpack for a long time to look for the virtual item, thereby improving the efficiency of seeking the virtual item and reducing steps for seeking the virtual item.

According to the method provided in this embodiment, while storing the target virtual item, the type of the target virtual item is first determined, and then the target virtual item is stored in a corresponding sublist according to the type, so that when the user checks the virtual backpack interface, the user may check the virtual items according to the type.

Figure 8:
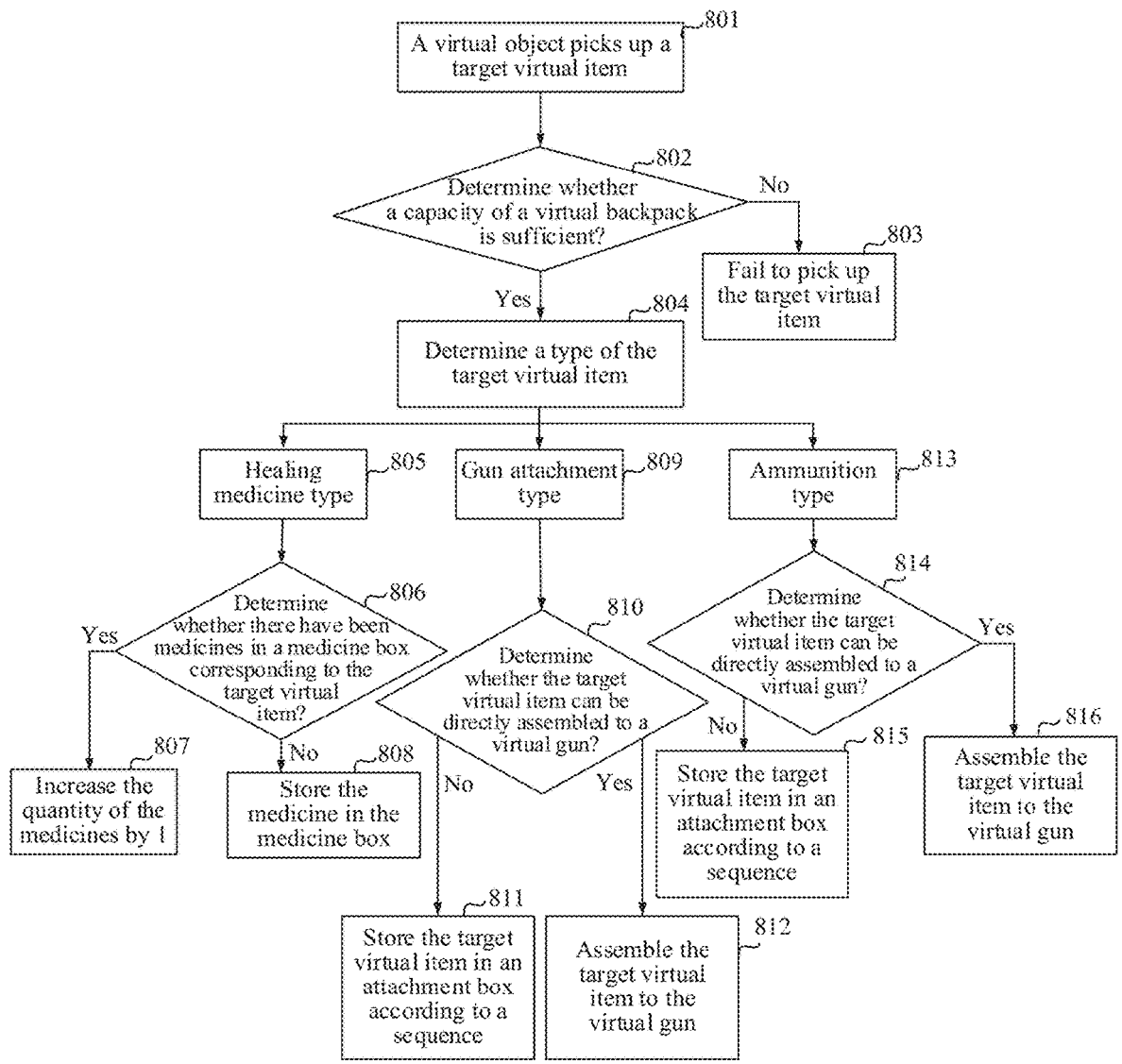
FIG. 8 is a flowchart of a display method for a virtual backpack interface according to yet another embodiment of this application.

FIG. 8 is a flowchart of a display method for a virtual backpack interface according to another exemplary embodiment of this application. In step 801, a virtual object picks up a target virtual item.

In step 802, whether a capacity of a virtual backpack is sufficient is determined.

First, a capacity occupied by the target virtual item in the virtual backpack is determined, and an available capacity of the virtual backpack is determined. The capacity of the virtual backpack is sufficient in a case that the capacity occupied by the target virtual item in the virtual backpack is not greater than the available capacity; otherwise, the capacity of the virtual backpack is insufficient.

In step 803, pick up of the target virtual item fails in a case that the capacity of the virtual backpack is insufficient.

In a case that the capacity of the virtual backpack is insufficient, the virtual object cannot pick up the target virtual item, and the virtual object fails to pick up the target virtual item.

In step 804, a type of the target virtual item is determined in a case that the capacity of the virtual backpack is sufficient.

In step 805, the target virtual item is determined to belong to a healing type.

In step 806, whether there are medicines in a medicine box corresponding to the target virtual item is determined.

In step 807, the quantity of the medicines is increased by 1 in a case that there are medicines in the medicine box corresponding to the target virtual item.

For example, if there are 6 first aid kits in the medicine box, and when the target virtual item is a first aid kit, the quantity of the first aid kits is increased by 1, that is, the medicine box includes 7 first aid kits.

Figure 9:
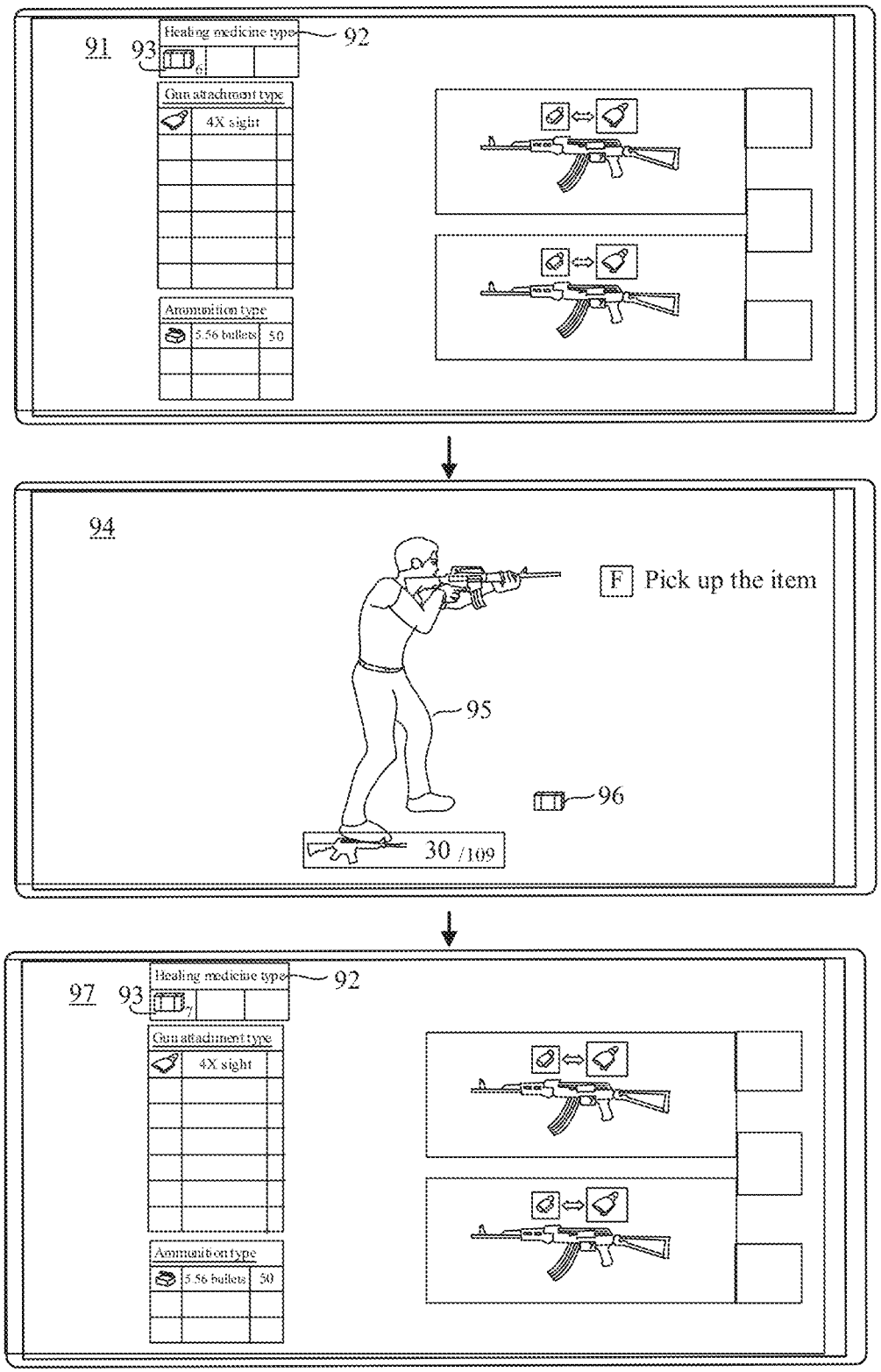
FIG. 9 is a schematic diagram of an interface of a virtual backpack interface according to another embodiment of this application.

For example, referring to FIG. 9, a first virtual backpack interface 91 includes a sublist 92 corresponding to the healing type, the sublist 92 includes a medicine box 93 corresponding to the first aid kit, and 6 first aid kits are displayed in the medicine box 93. A virtual object 95 is displayed in a second interface 94, and a virtual environment in which the virtual object 95 is located includes a first aid kit 96. Optionally, the first aid kit 96 is in a preset range of the virtual object 95, and when the user enters an "F" by using a keyboard, the virtual object 95 picks up the first aid kit 96, and 7 first aid kits are displayed in the medicine box 93 in a third virtual backpack interface 97.

In step 808, the medicine is stored in the medicine box in a case that there is no medicine in the medicine box corresponding to the target virtual item.

In step 809, the target virtual item is determined to belong to a gun attachment type.

In step 810, whether the target virtual item can be directly assembled to a virtual gun is determined.

The target virtual item may be directly assembled to a virtual gun in a case that the virtual object is equipped with the virtual gun, and a slot of the virtual gun for assembling the target virtual item is empty; otherwise, the target virtual item cannot be directly assembled to the virtual gun.

In step 811, the target virtual item is stored in an attachment box according to a sequence in a case that the target virtual item cannot be directly assembled to the virtual gun.

In step 812, the target virtual item is assembled to the virtual gun in a case that the target virtual item can be directly assembled to the virtual gun.

In step 813, the target virtual item is determined to belong to an ammunition type.

In step 814, whether the target virtual item can be directly assembled to a virtual gun is determined.

In step 815, the target virtual item is stored in an attachment box according to a sequence in a case that the target virtual item cannot be directly assembled to the virtual gun.

In step 816, the target virtual item is assembled to the virtual gun in a case that the target virtual item can be directly assembled to the virtual gun.

Figure 10:
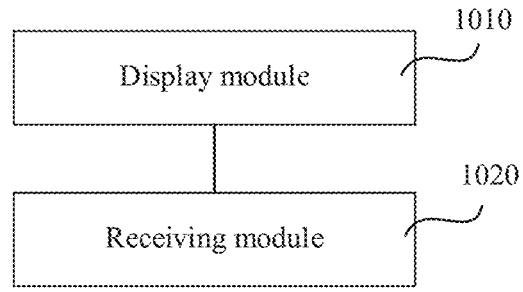
FIG. 10 is a structural block diagram of a display apparatus for a virtual backpack interface according to an embodiment of this application.

FIG. 10 is a structural block diagram of a display apparatus for a virtual backpack interface according to an exemplary embodiment of this application. The apparatus is applied to an virtual environment, and as shown in FIG. 10, the apparatus includes a display module 1010 and a receiving module 1020.

The display module 1010 is configured to display a main interface, the main interface including a picture of a virtual environment observed by a virtual object in a virtual gun battle process.

The receiving module 1020 is configured to receive a backpack display signal in a process of displaying the main interface.

The display module 1010 is further configured to display the virtual backpack interface according to the backpack display signal, the virtual backpack interface including at least two sublists, each sublist being used for displaying a same type of virtual item, and the type including at least one of a healing type, a gun attachment type, and an ammunition type.

Figure 11:
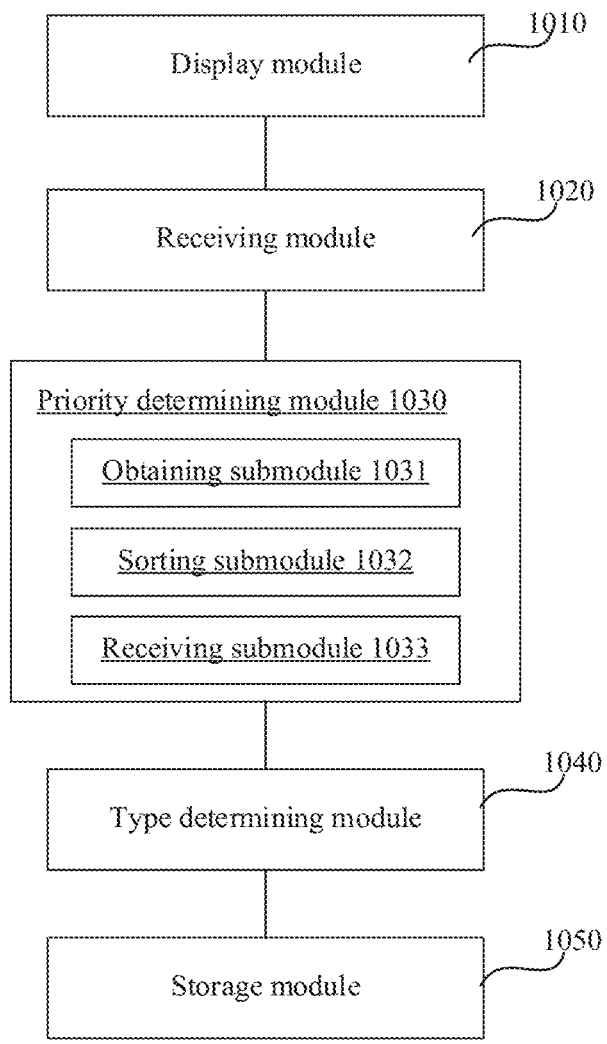
FIG. 11 is a structural block diagram of a display apparatus for a virtual backpack interface according to another embodiment of this application.

In an optional embodiment, as shown in FIG. 11, the apparatus further includes a priority determining module 1030, a type determining module 1040, and a storage module 1050.

The priority determining module 1030 is configured to determine priorities of types of virtual items corresponding to the sublists. The priority determining module 1030 is further configured to determine a display sequence of the sublists in the virtual backpack interface according to the priorities of the types corresponding to the sublists.

The display module 1010 is further configured to display the sublists sequentially according to the display sequence in the virtual backpack interface according to the backpack display signal.

In an optional embodiment, the priorities are obtained by sorting usage frequencies of the types; and the priority determining module 1030 includes an obtaining submodule 1031 and a sorting submodule 1032.

The obtaining submodule 1031 is configured to obtain historical item usage data, the historical item usage data including the usage frequencies of the types.

The sorting submodule 1032 is configured to sort the usage frequencies of the types according to the historical item usage data, to obtain the priorities of the types.

In an optional embodiment, the priority determining module 1030 includes a receiving submodule 1033 that is configured to receive a priority sorting signal, the priority sorting signal being used for instructing to sort the priorities of the types according to the priority sorting signal, to obtain the priorities of the types.

In an optional embodiment, the priority determining module 1030 is further configured to determine a demand state of the virtual object; set, in a case that the demand state meets a target demand state, a target type corresponding to the target demand state to a highest priority; sort types other than the target type according to preset priorities; and obtain the priorities of the types according to the highest priority and the preset priorities.

In an optional embodiment, the priority determining module 1030 is further configured to set the healing type to the highest priority in a case that a hit point value of the virtual object is less than a target hit point value.

In an optional embodiment, the priority determining module 1030 is further configured to set the ammunition type to the highest priority in a case that ammunition owned by the virtual object does not match a virtual gun that the virtual object is equipped with.

In an optional embodiment, the priority determining module 1030 is further configured to set the gun attachment type to the highest priority in a case that a first attachment assembled in a target slot of the virtual gun is damaged and the virtual object owns a second attachment that can be assembled to the target slot.

In an optional embodiment, the healing type corresponds to a first sublist, the gun attachment type corresponds to a second sublist, and the ammunition type corresponds to a third sublist; and the display module 1010 is further configured to display the virtual backpack interface according to the backpack display signal, the virtual backpack interface including the first sublist, the second sublist, and the third sublist arranged sequentially from top to bottom.

In an optional embodiment, the receiving module 1020 is further configured to receive a virtual item picking-up signal, the virtual item picking-up signal being used for instructing to pick up a target virtual item; and the apparatus further includes a type determining module 1040 and a storage module 1050.

The type determining module 1040 is configured to determine a type of the target virtual item.

The storage module 1050 is configured to store the target virtual item in a corresponding sublist according to the type of the target virtual item.

In an optional embodiment, the healing type includes a first type, and the target virtual item is a virtual item of the first type; and the storage module 1050 is further configured to increase, in a case that the first sublist corresponding to the healing type includes a first quantity of virtual items of the first type, the first quantity by a second quantity corresponding to the target virtual items, to obtain a third quantity of virtual items of the first type in the first sublist after the picking-up; and the storage module 1050 is further configured to store the target virtual item in the first sublist in a case that the first sublist does not include the target virtual item.

In an optional embodiment, the type of the target virtual item includes the gun attachment type. The storage module 1050 is further configured to assemble, in a case that the virtual object is equipped with a virtual gun in the virtual environment and a slot of the virtual gun for assembling the target virtual item is empty, the target virtual item to the slot. The storage module 1050 is further configured to store the target virtual item in the second sublist corresponding to the gun attachment type in a case that the virtual object is equipped with the virtual gun in the virtual environment and the slot of the virtual gun for assembling the target virtual item is not empty. The storage module 1050 is further configured to store the target virtual item in the second sublist in a case that the virtual object is equipped with the virtual gun in the virtual environment and the virtual gun does not include the slot for assembling the target virtual item. The storage module 1050 is further configured to store the target virtual item in the second sublist in a case that the virtual object is not equipped with the virtual gun in the virtual environment.

In an optional embodiment, the type of the target virtual item includes the ammunition type. The storage module 1050 is further configured to assemble, in a case that the virtual object is equipped with a virtual gun in the virtual environment, a clip assembled in the virtual gun matches the target virtual item, and the clip is empty, the target virtual item to the clip. The storage module 1050 is further configured to store the target virtual item in the third sublist corresponding to the ammunition type in a case that the virtual object is equipped with the virtual gun in the virtual environment, the clip assembled in the virtual gun matches the target virtual item, and the clip is not empty. The storage module 1050 is further configured to store the target virtual item in the third sublist in a case that the virtual object is equipped with the virtual gun in the virtual environment, and the clip assembled in the virtual gun does not match the target virtual item. The storage module 1050 is further configured to store the target virtual item in the third sublist in a case that the virtual object is not equipped with the virtual gun in the virtual environment.

In an optional embodiment, the type determining module 1040 is further configured to determine a capacity occupied by the target virtual item in the virtual backpack; determine an available capacity of the virtual backpack, the available capacity being obtained by calculating a difference between a total capacity of the virtual backpack and an occupied capacity of the virtual backpack; and determine the type of the target virtual item in a case that the capacity occupied by the target virtual item in the virtual backpack is not greater than the available capacity.

Based on the above, according to the display apparatus for a virtual backpack interface provided in an exemplary embodiment of this application, in a virtual gun battle, a plurality of sublists are displayed in the virtual backpack interface, and each sublist stores and displays virtual items of different types, so that when the user seeks a virtual item, the user only needs to seek the virtual item in a sublist corresponding to the type, to avoid a problem that when seeking a virtual item, due to a relatively large quantity of virtual items in the virtual backpack, the user needs to scroll down toward the bottom of a single list in the virtual backpack for a long time to look for the virtual item, thereby improving the efficiency of seeking the virtual item and reducing steps for seeking the virtual item, to satisfy a requirement that virtual items are required to be quickly found in a virtual gun battle.

Figure 12:
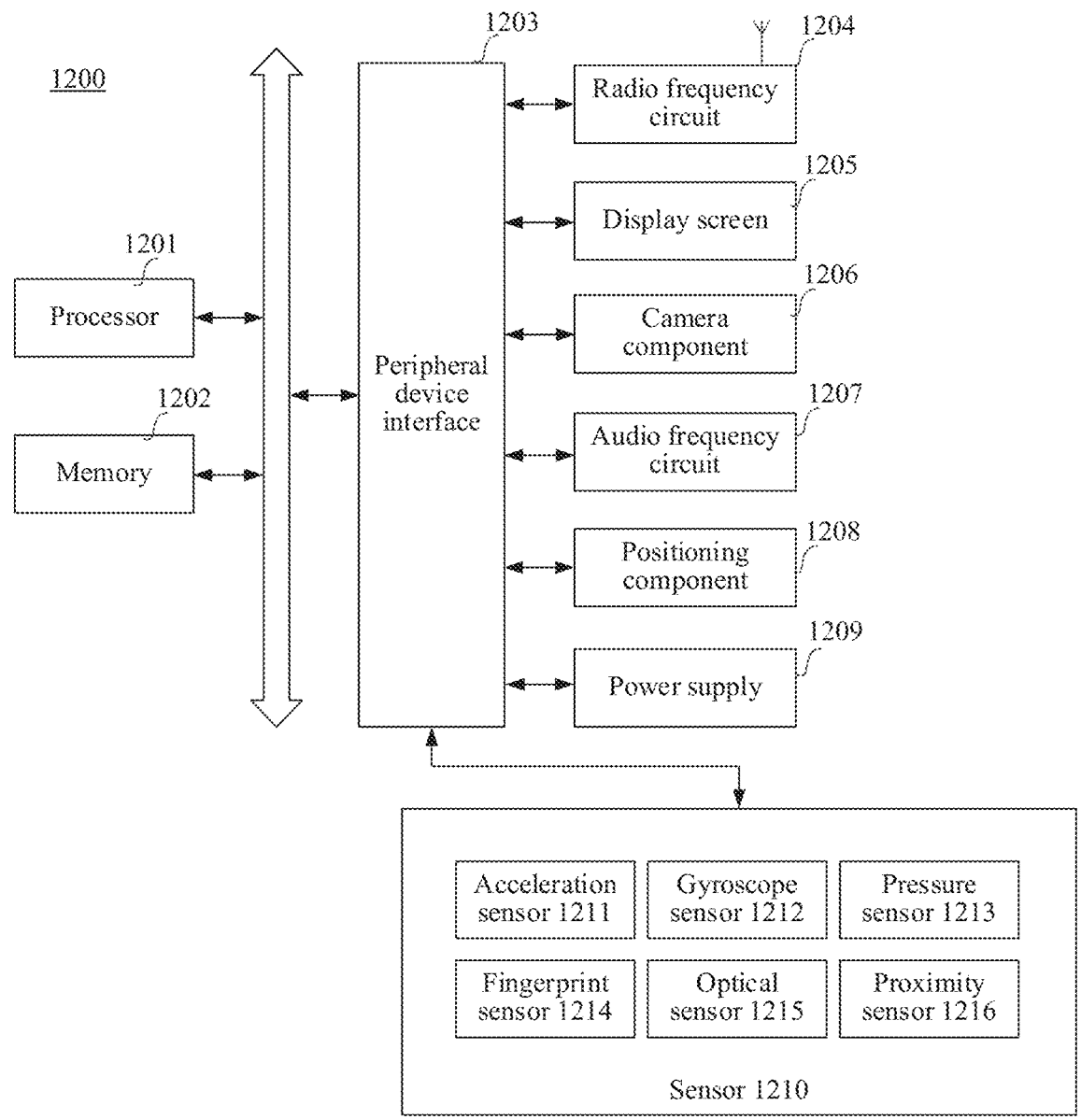
FIG. 12 is a structural block diagram of an electronic device according to an exemplary embodiment of this application.

FIG. 12 shows a structural block diagram of an electronic device 1200 according to an exemplary embodiment of this application. The electronic device 1200 may be a smartphone, a tablet computer, a moving picture experts group audio layer III (MP3) player, a moving picture experts group audio layer IV (MP4) player, a notebook computer, or a desktop computer. The electronic device 1200 may also be referred to as another name such as user equipment, a portable terminal, a laptop terminal, or a desktop terminal.

Generally, the electronic device 1200 includes: a processor 1201 (e.g., processing circuitry), and a memory 1202.

The processor 1201 may include one or more processing cores, for example, a 4-core processor or an 8-core processor. The processor 1201 may be implemented by at least one hardware form of a digital signal processor (DSP), a field-programmable gate array (FPGA), and a programmable logic array (PLA). The processor 1201 may alternatively include a main processor and a coprocessor. The main processor is a processor configured to process data in an awake state, also referred to as a central processing unit (CPU), and the coprocessor is a low-power processor configured to process data in an idle state. In some embodiments, the processor 1201 may be integrated with a graphics processing unit (GPU). The GPU is responsible for rendering and drawing content to be displayed by a display screen. In some embodiments, the processor 1201 may further include an artificial intelligence (AI) processor. The AI processor is configured to process a calculation operation related to machine learning.

The memory 1202 may include one or more computer-readable storage media. The computer-readable storage media may be non-transient. The memory 1202 may further include a high-speed random access memory, and a non-volatile memory such as one or more magnetic disk storage devices and a flash memory device. In some embodiments, the non-transient (or non-transitory) computer-readable storage medium in the memory 1202 is configured to store at least one computer-readable instruction, and the at least one computer-readable instruction is configured to be executed by the processor 1201 to implement the display method for a virtual backpack interface provided in the method embodiment of this application.

In some embodiments, the electronic device 1200 further optionally includes a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a radio frequency (RF) circuit 1204, a touch display screen 1205, a camera component 1206, an audio frequency circuit 1207, a positioning component 1208, and a power source 1209.

The peripheral device interface 1203 may be configured to connect the at least one peripheral device related to input/output (I/O) to the processor 1201 and the memory 1202. In some embodiments, the processor 1201, the memory 1202, and the peripheral device interface 1203 are integrated into the same chip or circuit board. In some other embodiments, any one or two of the processor 1201, the memory 1202, and the peripheral device interface 1203 may be implemented on an independent chip or circuit board, and the implementation is not limited in this embodiment.

The RF circuit 1204 is configured to receive and transmit a RF signal, also referred to as an electromagnetic signal. The RF circuit 1204 communicates with a communications network and another communications device by using the electromagnetic signal. The RF circuit 1204 may convert an electric signal into an electromagnetic signal for transmission, or convert a received electromagnetic signal into an electric signal. Optionally, the RF circuit 1204 includes an antenna system, an RF transceiver, one or more amplifiers, a tuner, an oscillator, a digital signal processor, a codec chip set, a subscriber identity module card, and the like. The RF circuit 1204 may communicate with other electronic devices through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a Wi-Fi network. In some embodiments, the RF circuit 1204 may further include a near field communication (NFC) related circuit. This is not limited in this application.

The display screen 1205 is configured to display a user interface (UI). The UI may include a graph, text, an icon, a video, and any combination thereof. When the display screen 1205 is a touch display screen, the display screen 1205 is further capable of collecting a touch signal on or over a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there may be one display screen 1205, disposed on a front panel of the electronic device 1200. In some other embodiments, there may be at least two display screens 1205, respectively disposed on different surfaces of the electronic device 1200 or designed in a foldable shape. In still some other embodiments, the display screen 1205 may be a flexible display screen, disposed on a curved surface or a folded surface of the electronic device 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to collect an image or a video. Optionally, the camera component 1206 includes a front-facing camera and a rear-facing camera. Generally, the front-facing camera is disposed on the front panel of the electronic device, and the rear-facing camera is disposed on a back face of the electronic device. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1206 may further include a flash. The flash may be a single color temperature flash or a double color temperature flash. The double color temperature flash refers to a combination of a warm flash and a cold flash, and may be configured to perform light ray compensation at different color temperatures.

The audio circuit 1207 may include a microphone and a loudspeaker. The microphone is configured to collect sound waves of a user and an environment, and convert the sound waves into electrical signals and input the electrical signals into the processor 1201 for processing, or input the electrical signals into the RF circuit 1204 to implement speech communication. For the purpose of stereo sound collection or noise reduction, there may be a plurality of microphones, respectively disposed at different parts of the electronic device 1200. The microphone may be further a microphone array or an omnidirectional collection microphone. The loudspeaker is configured to convert electrical signals from the processor 1201 or the RF circuit 1204 into sound waves. The loudspeaker may be a thin-film loudspeaker or a piezoelectric ceramic loudspeaker. When the loudspeaker is the piezoelectric ceramic loudspeaker, electrical signals not only can be converted into sound waves that can be heard by human, but also can be converted into sound waves that cannot be heard by human for ranging and the like. In some embodiments, the audio circuit 1207 may further include an earphone jack.

The positioning component 1208 is configured to determine a current geographic location of the electronic device 1200 through positioning, to implement navigation or a location based service (LBS). The positioning component 1208 may be a positioning component based on the Global Positioning System (GPS) of the United States, the China's Beidou Navigation Satellite System (BDS), GLONASS of Russia, or the Galileo system of the European Union.

The power supply 1209 is configured to supply power to components in the electronic device 1200. The power supply 1209 may be an alternating current, a direct current, a primary battery, or a rechargeable battery. When the power supply 1209 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the electronic device 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect accelerations on three coordinate axes of a coordinate system established by the electronic device 1200. For example, the acceleration sensor 1211 may be configured to detect components of gravity acceleration on the three coordinate axes. The processor 1201 may control, according to a gravity acceleration signal collected by the acceleration sensor 1211, the touch display screen 1205 to display the user interface in a frame view or a portrait view. The acceleration sensor 1211 may be further configured to collect motion data of a game or a user.

The gyroscope sensor 1212 may detect a body direction and a rotation angle of the electronic device 1200. The gyroscope sensor 1212 may cooperate with the acceleration sensor 1211 to collect a 3D action by the user on the electronic device 1200. The processor 1201 may implement the following functions according to data collected by the gyroscope sensor 1212: motion sensing (e.g., the UI is changed according to a tilt operation of the user), image stabilization during shooting, game control, and inertial navigation.

The pressure sensor 1213 may be disposed on a side frame of the electronic device 1200 and/or a lower layer of the touch display screen 1205. When the pressure sensor 1213 is disposed on the side frame of the electronic device 1200, a holding signal of the user on the electronic device 1200 may be detected. The processor 1201 performs left and right hand recognition or a quick operation according to the holding signal collected by the pressure sensor 1213. When the pressure sensor 1213 is disposed on the low layer of the touch display screen 1205, the processor 1201 controls, according to a pressure operation of the user on the touch display screen 1205, an operable control on the UI. The operable control includes at least one of a button control, a scroll bar control, an icon control, and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front face, a back face, or a side face of the electronic device 1200. When a physical button or a vendor logo is disposed on the electronic device 1200, the fingerprint sensor 1214 may be integrated together with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. Specifically, when the ambient light intensity is relatively high, the display luminance of the touch display screen 1205 is increased. When the ambient light intensity is relatively low, the display luminance of the touch display screen 1205 is reduced. In another embodiment, the processor 1201 may further dynamically adjust shooting parameters of the camera component 1206 according to the ambient light intensity collected by the optical sensor 1215.

The proximity sensor 1216, also referred to as a distance sensor, is usually disposed on the front panel of the electronic device 1200. The proximity sensor 1216 is configured to collect a distance between a front face of the user and the front face of the electronic device 1200. In an embodiment, when the proximity sensor 1216 detects that the distance between the front face of the user and the front face of the electronic device 1200 is gradually decreased, the processor 1201 controls the touch display screen 1205 to switch from a screen-on state to a screen-off state. When the proximity sensor 1216 detects that the distance between the front face of the user and the front face of the electronic device 1200 is gradually increased, the processor 1201 controls the touch display screen 1205 to switch from the screen-off state to the screen-on state.

A person skilled in the art may understand that the structure shown in FIG. 12 does not constitute a limitation on the electronic device 1200, and the electronic device may include more components or fewer components than those shown in the figure, or some components may be combined, or a different component deployment may be used Persons of ordinary skill in the art may understand that all or a part of the steps of the methods in the embodiments may be implemented by a computer-readable instruction instructing related hardware. The computer-readable instruction may be stored in a computer-readable storage medium. The computer-readable storage medium may be a computer-readable storage medium included in the memory in the foregoing embodiment, or may be a computer-readable storage medium existing independently and being not assembled in the electronic device. The computer-readable storage medium stores at least one computer-readable instruction, at least one program, a code set or an instruction set, the at least one instruction, the at least one program, the code set or the instruction set being loaded and executed by the processor to implement the display method for a virtual backpack interface according to any one of FIG. 1 to FIG. 8.

Optionally, the computer-readable storage medium (e.g., non-transitory computer-readable storage medium) may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

A person of ordinary skill in the art may understand that all or some of steps of the embodiments may be implemented by hardware or a computer-readable instruction instructing related hardware. The computer-readable instruction may be stored in a non-volatile computer-readable storage medium. The storage medium mentioned above may be a ROM, a magnetic disk, an optical disc, or the like.

The foregoing descriptions are merely exemplary embodiments of this application, but are not intended to limit this application. Any modification, equivalent replacement, or improvement made without departing from the spirit and principle of this application falls within the protection scope of this application.

What is claimed is:

1. A method for displaying a virtual backpack interface in a game application, comprising:
displaying, by processing circuitry, a main interface including a virtual environment of a virtual object in the game application;
receiving, by the processing circuitry, a backpack display signal during the display of the main interface; and
displaying, by the processing circuitry, the virtual backpack interface that includes at least two sublists including different types of virtual items in response to the backpack display signal, each of the sublists including only one of the different types of virtual items, the different types of virtual items includes at least one of a healing type, a gun attachment type, and an ammunition type,
wherein display positions of the at least two sublists in the virtual backpack interface are based on determined priorities of the types of virtual items.

2. The method according to claim 1, wherein before the displaying the virtual backpack interface, the method further includes:
determining the priorities of the types of virtual items corresponding to the sublists, and
determining a display order of the sublists in the virtual backpack interface based on the priorities of the types of virtual items corresponding to the sublists; and
the displaying the virtual backpack interface includes concurrently displaying the sublists based on the display order in the virtual backpack interface in response to the backpack display signal.

3. The method according to claim 2, wherein the determining the priorities of the types of virtual items comprises:
obtaining historical item usage data, the historical item usage data indicating usage frequencies of virtual items belonging to the types of virtual items, and
sorting the usage frequencies of the types of virtual items according to the historical item usage data, to obtain the priorities of the types of virtual items.

4. The method according to claim 2, wherein the determining the priorities of the types of virtual items comprises:

receiving a priority sorting signal, the types of virtual items being sorted according to the priority sorting signal to obtain the priorities of the types of virtual items.

5. The method according to claim 2, wherein the determining the priorities of the types of virtual items comprises:
determining a demand state of the virtual object for a target type of the types of virtual items;
setting, in a case that the demand state meets a target demand state of the virtual object for the target type of the types of virtual items, the target type of virtual items corresponding to the target demand state to a highest priority;
sorting the types of virtual items other than the target type according to preset priorities; and
obtaining the priorities of the types of virtual items according to the highest priority and the preset priorities.

6. The method according to claim 5, wherein the setting comprises:
setting the healing type to the highest priority in a case that a hit point value of the virtual object is less than a target hit point value and the target type is the healing type;
setting the ammunition type to the highest priority in a case that ammunition of the virtual object does not match a virtual gun that the virtual object is equipped with and the target type is the ammunition type; and
setting the gun attachment type to the highest priority in a case that a first attachment of the virtual gun is damaged and a second attachment is included in a sublist of the gun attachment type.

7. The method according to claim 1, wherein
the healing type corresponds to a first sublist, the gun attachment type corresponds to a second sublist, and the ammunition type corresponds to a third sublist; and
the virtual backpack interface concurrently displays the first sublist, the second sublist, and the third sublist arranged from top to bottom.

8. The method according to claim 1, further comprising:
receiving a virtual item picking-up signal to pick up a target virtual item;
determining a type of the target virtual item; and
storing the target virtual item in a corresponding sublist of the at least two sublists according to the type of the target virtual item.

9. The method according to claim 8, wherein
the healing type includes a first type of virtual item, and the target virtual item is of the first type of virtual item; and
the storing the target virtual item in the corresponding sublist includes increasing, in a case that a first sublist corresponding to the healing type includes a first quantity of virtual items of the first type of virtual item, the first quantity of virtual items by adding a second quantity of virtual items corresponding to the target virtual item, to obtain a third quantity of virtual items of the first type in the first sublist after the target virtual item is picked up.

10. The method according to claim 8, wherein
the type of the target virtual item is the gun attachment type; and
the storing the target virtual item in the corresponding sublist includes:
assembling the target virtual item to a slot of a virtual gun in a case that the virtual object is equipped with the virtual gun in the virtual environment and the slot of the virtual gun for assembling the target virtual item is empty;
storing the target virtual item in a second sublist corresponding to the gun attachment type in a case that the virtual object is equipped with the virtual gun in the virtual environment and the slot of the virtual gun for assembling the target virtual item is not empty;
storing the target virtual item in the second sublist in a case that the virtual object is equipped with the virtual gun in the virtual environment and the virtual gun does not include the slot for assembling the target virtual item; and
storing the target virtual item in the second sublist in a case that the virtual object is not equipped with the virtual gun in the virtual environment.

11. The method according to claim 8, wherein
the type of the target virtual item is the ammunition type; and
the storing the target virtual item in the corresponding sublist includes:
loading the target virtual item into a clip in a case that the virtual object is equipped with a virtual gun in the virtual environment, the clip assembled in the virtual gun matches the target virtual item, and the clip is empty;
storing the target virtual item in a third sublist corresponding to the ammunition type in a case that the virtual object is equipped with the virtual gun in the virtual environment, the clip assembled in the virtual gun matches the target virtual item, and the clip is not empty;
storing the target virtual item in the third sublist in a case that the virtual object is equipped with the virtual gun in the virtual environment, and the clip assembled in the virtual gun does not match the target virtual item; and
storing the target virtual item in the third sublist in a case that the virtual object is not equipped with the virtual gun in the virtual environment.

12. The method according to claim 8, wherein the determining the type of the target virtual item comprises:
determining an occupied capacity of the target virtual item in a virtual backpack;
determining an available capacity of the target virtual item in the virtual backpack, the available capacity being calculated by a difference between a total capacity of the target virtual item in the virtual backpack and the occupied capacity of the target virtual item in the virtual backpack; and
determining the type of the target virtual item in a case that the occupied capacity of the target virtual item in the virtual backpack is less than or equal to the available capacity of the target virtual item in the virtual backpack.

13. A display apparatus comprising:
processing circuitry configured to
display a main interface including a virtual environment of a virtual object in a game application;
receive a backpack display signal during the display of the main interface; and
display a virtual backpack interface that includes at least two sublists including different types of virtual items in response to the backpack display signal, each of the sublist including only one of the different types of virtual items, the different types of virtual items including at least one of a healing type, a gun attachment type, and an ammunition type, wherein display positions of the at least two sublists in the virtual backpack interface are based on determined priorities of the types of virtual items.

14. The display apparatus according to claim 13, wherein the processing circuitry is configured to
determine the priorities of the types of virtual items corresponding to the sublists;
determine a display order of the sublists in the virtual backpack interface based on the priorities of the types of virtual items corresponding to the sublists; and
concurrently display the sublists based on the display order in the virtual backpack interface in response to the backpack display signal.

15. The display apparatus according to claim 14, wherein the processing circuitry is configured to
obtain historical item usage data, the historical item usage data indicating usage frequencies of virtual items belonging to the types of virtual items; and
sort the usage frequencies of the types according to the historical item usage data, to obtain the priorities of the types.

16. The display apparatus according to claim 14, wherein the processing circuitry is configured to
receive a priority sorting signal, the types of virtual items being sorted according to the priority sorting signal to obtain the priorities of the types of virtual items.

17. The display apparatus according to claim 14, wherein the processing circuitry is configured to
determine a demand state of the virtual object for a target type of the types of virtual items;
set, in a case that the demand state meets a target demand state of the virtual object for the target type of the types of virtual items, the target type of virtual items corresponding to the target demand state to a highest priority;
sort the types of virtual items other than the target type according to preset priorities; and
obtain the priorities of the types of virtual items according to the highest priority and the preset priorities.

18. The display apparatus according to claim 17, wherein the processing circuitry is configured to
set the healing type to the highest priority in a case that a hit point value of the virtual object is less than a target hit point value and the target type is the healing type;
set the ammunition type to the highest priority in a case that ammunition of the virtual object does not match a virtual gun that the virtual object is equipped with and the target type is the ammunition type; and
set the gun attachment type to the highest priority in a case that a first attachment of the virtual gun is damaged and a second attachment is included in a sublist of the gun attachment type.

19. The display apparatus according to claim 13, wherein the healing type corresponds to a first sublist, the gun attachment type corresponds to a second sublist, and the ammunition type corresponds to a third sublist; and
the virtual backpack interface concurrently displays the first sublist, the second sublist, and the third sublist arranged from top to bottom.

20. A non-transitory computer-readable storage medium, storing instructions which when executed by at least one processor cause the at least one processor to perform:
displaying a main interface including a virtual environment of a virtual object in a game application;
receiving a backpack display signal during the display of the main interface; and
displaying the virtual backpack interface that includes at least two sublists including different types of virtual items in response to the backpack display signal, each of the sublists including only one of the different types of virtual items, the different types of virtual items including at least one of a healing type, a gun attachment type, and an ammunition type,
wherein display positions of the at least two sublists in the virtual backpack interface are based on determined priorities of the types of virtual items.

21. The method according to claim 1, wherein the displaying the virtual backpack interface comprises:
displaying, by the processing circuitry, the virtual backpack interface that concurrently displays at least two sublists including different types of virtual items stored in a virtual backpack in response to the backpack display signal.

* * * * *